United States Patent

Maconga

[11] Patent Number: 6,119,391
[45] Date of Patent: Sep. 19, 2000

[54] SAFETY TRAP SETTING DEVICE

[76] Inventor: John L. Maconga, 86 Winesap Rd., Pittsfield, Mass. 01201

[21] Appl. No.: 09/122,534

[22] Filed: Jul. 24, 1998

Related U.S. Application Data

[60] Provisional application No. 60/053,675, Jul. 24, 1997.

[51] Int. Cl.[7] .......................... A01K 23/24; A01K 23/30
[52] U.S. Cl. ..................................... 43/58; 43/81; 43/81.5
[58] Field of Search .................................. 43/81, 97, 58, 43/77, 81.5, 96; 211/87.01, 88.01; 248/447.1, 447.2, 441.1

[56] References Cited

U.S. PATENT DOCUMENTS

| | | | |
|---|---|---|---|
| 378,790 | 2/1888 | Herrington | 43/97 |
| 409,340 | 8/1889 | Unz | 248/441.1 |
| 446,921 | 2/1891 | Maul | 43/97 |
| 656,540 | 8/1900 | Generous | 43/97 |
| 744,379 | 11/1903 | Mast . | |
| 875,510 | 12/1907 | Engen | 43/97 |
| 898,731 | 9/1908 | Ellis | 43/97 |
| 1,238,679 | 8/1917 | Jacob | 43/97 |
| 1,398,601 | 11/1921 | Osterhout | 248/447.2 |
| 1,441,523 | 1/1923 | Pittman | 43/81.5 |
| 1,472,666 | 10/1923 | Munroe . | |
| 1,473,242 | 11/1923 | Marshall | 43/81 |
| 1,477,446 | 12/1923 | Reisiger . | |
| 1,726,127 | 8/1929 | Seghers . | |
| 1,868,714 | 7/1932 | Mills | 43/96 |
| 1,897,151 | 2/1933 | Seghers . | |
| 1,967,179 | 7/1934 | Schocke | 43/81 |
| 2,146,351 | 2/1939 | Stilson . | |
| 2,787,067 | 4/1957 | Nichols | 248/441.1 |
| 3,135,513 | 6/1964 | Simpson | 248/441.1 |
| 3,392,478 | 7/1968 | Strayline | 43/81.5 |
| 3,408,032 | 10/1968 | Francis | 248/447.1 |
| 3,677,510 | 7/1972 | Kenwell | 248/441.1 |
| 3,833,197 | 9/1974 | Dyke | 248/441.1 |
| 3,889,914 | 6/1975 | Torme | 248/447.2 |
| 4,230,355 | 10/1980 | Petrunich | 43/96 |
| 4,363,183 | 12/1982 | Drdik | 43/81.5 |
| 4,414,773 | 11/1983 | Moyers | 43/97 |
| 4,460,145 | 7/1984 | Ando | 248/447.1 |
| 4,505,064 | 3/1985 | Smagner | 43/96 |
| 5,001,857 | 3/1991 | McDaniel et al. | 43/81 |
| 5,050,337 | 9/1991 | Moore et al. | 43/97 |
| 5,094,349 | 3/1992 | DeVito | 211/88.01 |
| 5,148,624 | 9/1992 | Schmidt | 43/81 |

FOREIGN PATENT DOCUMENTS

| | | | |
|---|---|---|---|
| 139621 | 12/1950 | Australia | 43/97 |
| 478443 | 11/1951 | Canada | 43/97 |

OTHER PUBLICATIONS

Jack Hope—AmericanHeritage, The Most Invented Invention—150 Years of an American Obsession–building a better mousetrap Oct. 1996 (90–96).

Primary Examiner—Michael J. Carone
Assistant Examiner—Darren W. Ark
Attorney, Agent, or Firm—Perkins, Smith & Cohen, LLP; Jacob N. Erlich; Jerry Cohen

[57] ABSTRACT

A safety trap setting device for use in conjunction with a snap type trap having a selectively activated member. The safety trap setting device has a structure configured to accept at least a portion of the snap type trap therein and a mechanism for preventing the selectively activated member from becoming fully activated when at least a portion of the snap type trap is within the structure of the snap type trap.

8 Claims, 4 Drawing Sheets

SAFETY TRAP SETTING DEVICE

CROSS REFERENCE TO RELATED APPLICATION

This application claims priority of provisional application Serial No. 60/053,675 filed Jul. 24, 1997 entitled SAFETY TRAP SETTING DEVICE by the present inventor.

BACKGROUND OF THE INVENTION

This invention relates generally to snap-type mouse or rat (rodent) traps, and, more particularly, to a device used in conjunction therewith to prevent the accidental, premature or inadvertent activation or release of the snap mechanism of the trap.

The "snap trap" type mouse/rat trap's success is evident by its long-standing dominance in the market. It was created in 1899 and patented in 1903 (U.S. Pat. No. 744,379) by John Mast of Lititz, Pa. where it continues to be manufactured by Woodstream Corporation under the trade name Victor. There has, however, always been a fear associated with the setting of these types of traps. The fear results from individuals' concerns that their finger may endure the same fate as the targeted mouse and get caught in the trap. This result may happen at several stages in the setting of the trap when it is necessary to put you fingers on the snapping side of the spring in baiting, setting, testing or placing of the trap. This fear escalates with the size of the trap—the springs tend to become stronger as the traps grow larger, for example with similar type of rat traps.

Furthermore, it is necessary under certain circumstances to adjust the sensitivity of the snap mechanism of the trap. Testing of this sensitivity can also be a fearful, if not even hazardous experience. Testing the sensitivity could be accomplished with a pencil or other object, but you could go through a lot of pencils before finishing and there still was the uncertainty of where the pencil parts or trap would fly after the trap was set off.

Several attempts have been made to remove the fear of setting these traps by inventing new mousetraps which function in different ways or by making design changes to the snap type mouse traps. These efforts have generally not met with significant success because the resulting traps are less effective, too difficult to use or too expensive.

It is therefore an object of this invention to provide a device which can be utilized with a snap-type trap to safely position the snap mechanism while baiting, adjusting or transporting the trap.

It is an other object of this invention to provide a safety setting device which removes the fear associated with utilizing snap-type traps.

It is an even further object of this invention to provide a safety setting device which is economical to manufacture.

SUMMARY OF THE INVENTION

The objects set forth above as well as further and other objects and advantages of the present invention are achieved by the embodiments of the invention described hereinbelow.

The present invention provides a device which can be safely used with a variety of snap-type traps (mouse, rat and the like) by effectively holding the snap mechanism in a secure position during the baiting or adjustment of the trap. Hereinafter, the term "mouse" will refer to any other type of rodent as well such as a rat or the like.

The device of the present invention further (1) eliminates the fear of setting snap type mouse traps; (2) works with existing mouse traps already prevalent in the market without requiring any changes in the manufacturing of those mouse traps; (3) is designed in a way that can accommodate various sizes and types of mouse traps by simply making the components of the device adjustable or by changing the size of the various components of the invention.

Additionally the device of the present invention is inexpensive to manufacture and can be manufactured out of a variety of commonly available materials, can be easily packaged together with existing mousetraps for sale and its simple design provides durability and value.

The safety setting device of the present invention eliminates the fear of setting, testing, adjusting and placing into position a snap type mouse trap. With this invention any time after the spring ("bow") of the mouse trap is pulled back, your fingers remain on the risk free side of the mouse trap. The mouse trap is then inserted into the device which prevents the spring from fully releasing thus eliminating the danger of your fingers getting caught. While the trap is in the device of this invention, you can set it, test its sensitivity, and even adjust the sensitivity all without the fear of having your fingers caught. Once the trap is set, it can be easily removed either by sliding it out of the safety setting device or by physically removing with your fingers touching only the safe side of the mouse trap.

In addition, the invention not only permits insertion of the trap, but also includes features which simultaneously accommodate blocking the bow from fully deploying, yet allowing it to partially deploy and accept variations in the manufacture of the mouse traps, providing the locking bar a path for engagement, maintaining a secure seating for the mouse trap and a methodology for setting, testing, adjusting and positioning the mouse trap while eliminating the fear of fingers getting caught by keeping the fingers on the safe side of the mouse trap at all times.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENT

Figure 1:
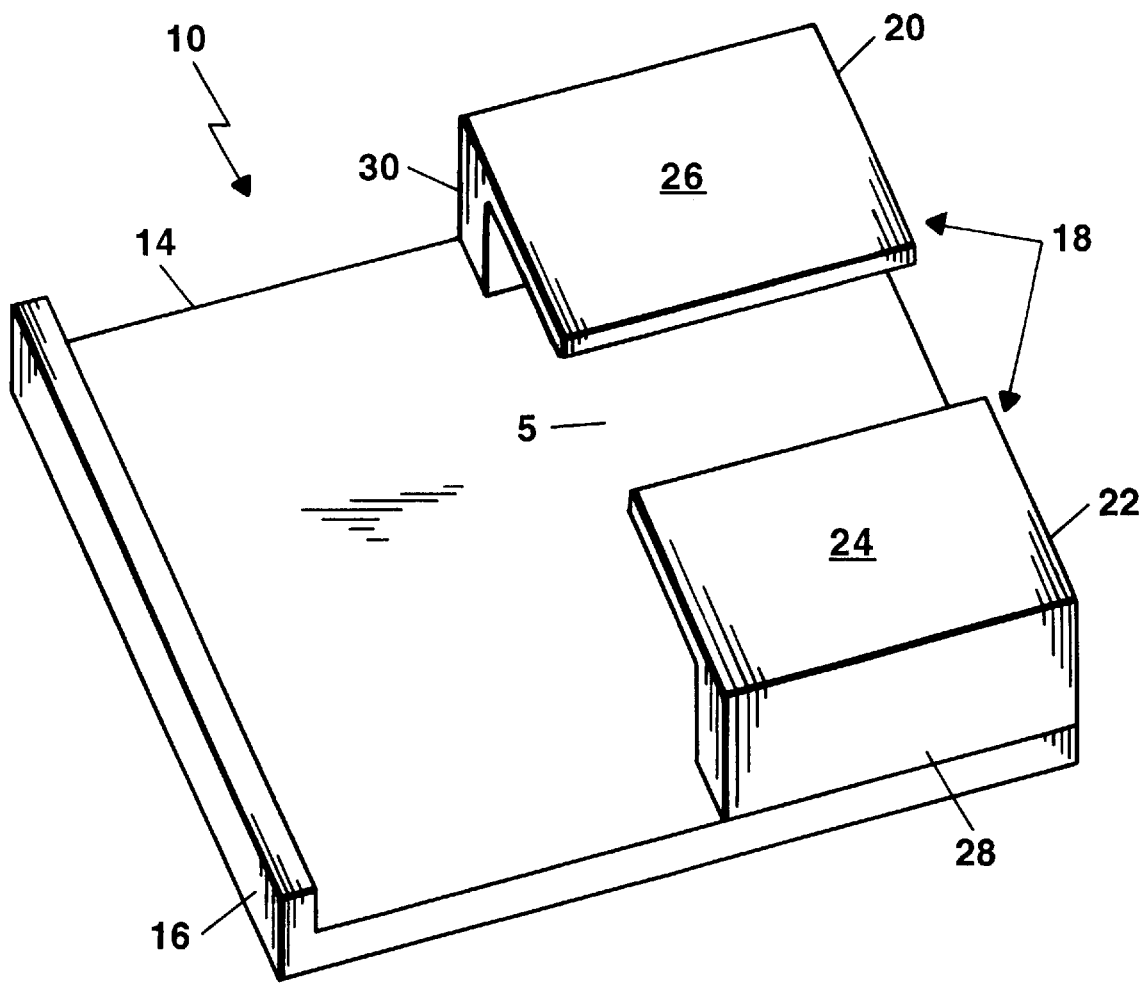
FIG. 1 pictorially illustrates the safety trap setting device of this invention.
Figure 2:
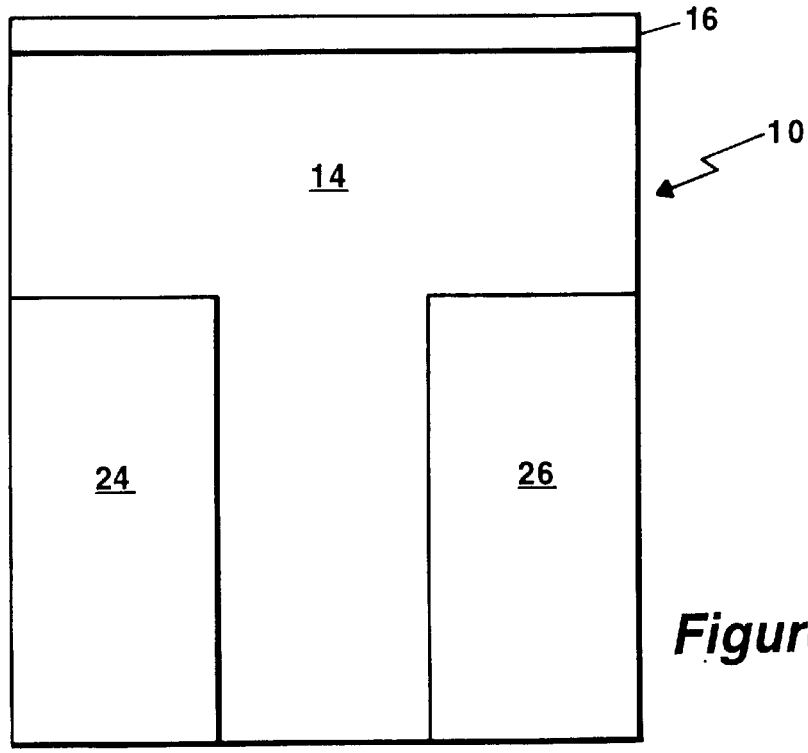
FIG. 2 is a top view of the safety trap setting device of this invention.
Figure 3:
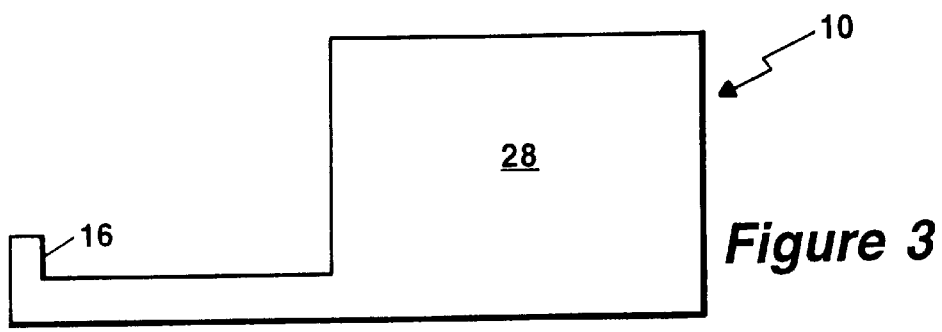
FIG. 3 is a side view of the safety trap setting device of this invention.
Figure 4:
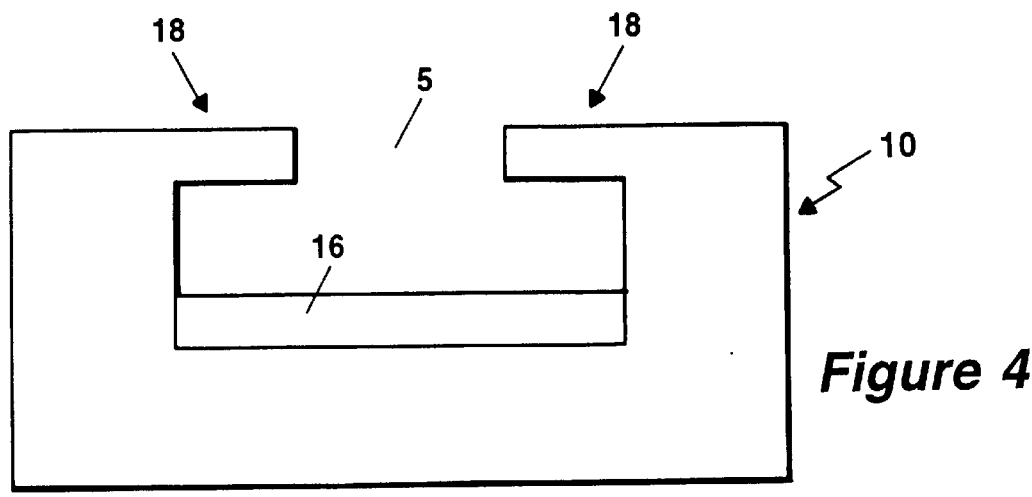
FIG. 4 is a front view of the safety trap setting device of this invention.
Figure 5:
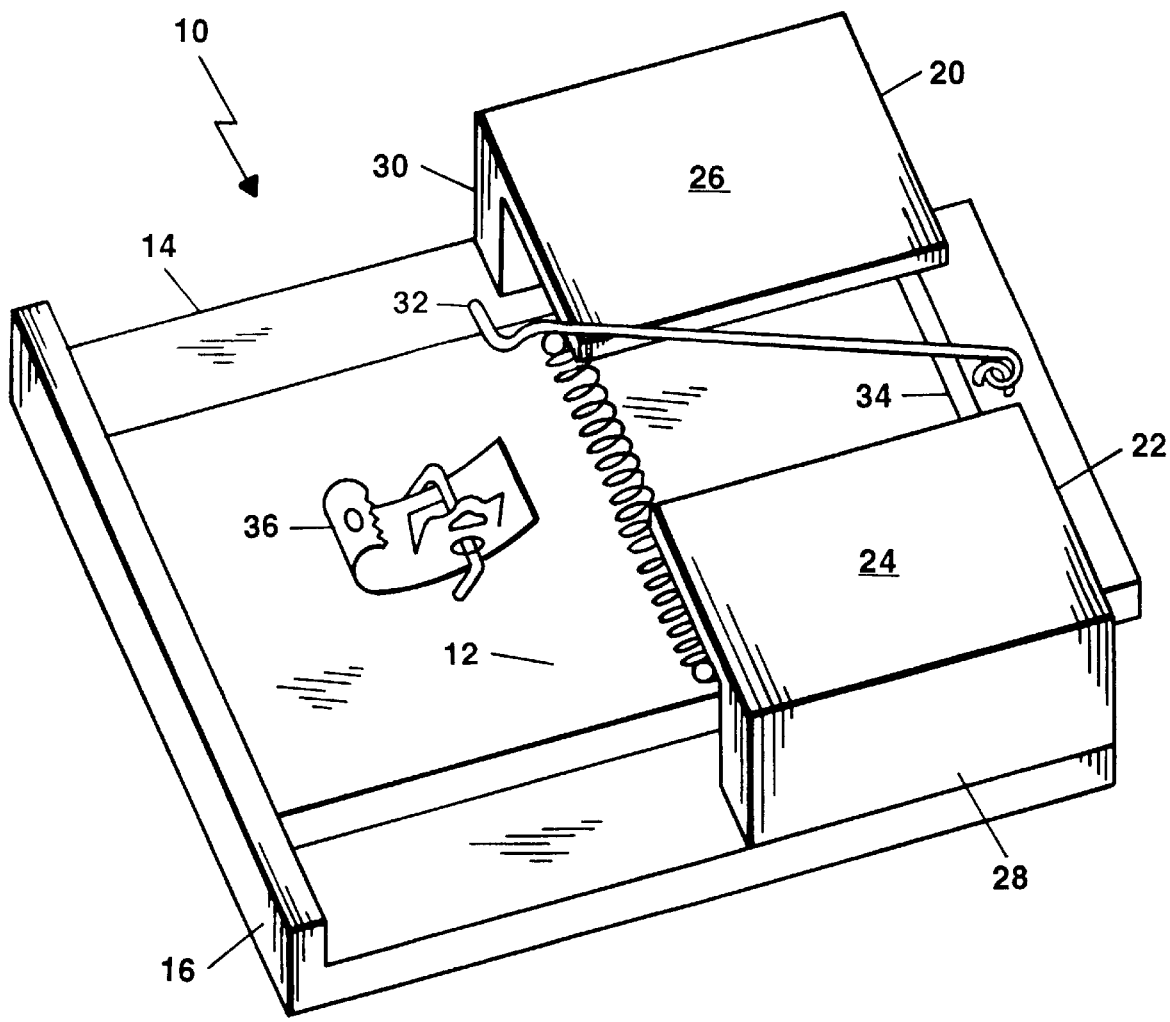
FIG. 5 pictorially illustrates the safety trap setting device of this invention with a snap-type trap in place therein.

The safety trap setting device 10 of this invention (also referred to as the "Trap Setter"), is in the form of a unit separate from a conventional mouse/rat trap 12 (shown in FIG. 5). The fact that it is a separate unit allows for it to be re-used indefinitely for setting the same trap or any other trap of similar size and type. This fact makes the small investment for the Trap Setter an even better value.

Referring now to FIGS. 1–4 of the drawings, the Trap Setter 10 has a base 14 on which the trap rests. The base 14 need not be particularly thick in that its functions are simply to position the mouse trap and attach the other parts of the Trap Setter. It may, in fact, be advantageous to have a thin base in that it would allow removal of the mouse trap 12 from the Trap Setter 10 by simply tilting the Trap Setter 10 and allowing the mouse trap 14 to slide out. The thinner the base, the less jarring that would occur as the mouse trap 10 reaches the surface onto which it is being placed. The base 14 could also be constructed to include a ramp at the end to allow a mouse trap to be slid out more smoothly or even to build the entire base in such a way so that it tapers down on the loading end or front F, making the base 14 itself is a ramp. Further, a portion of the base could be removed to form a U-shaped configuration into which the snap trap would be inserted.

Figure 6:
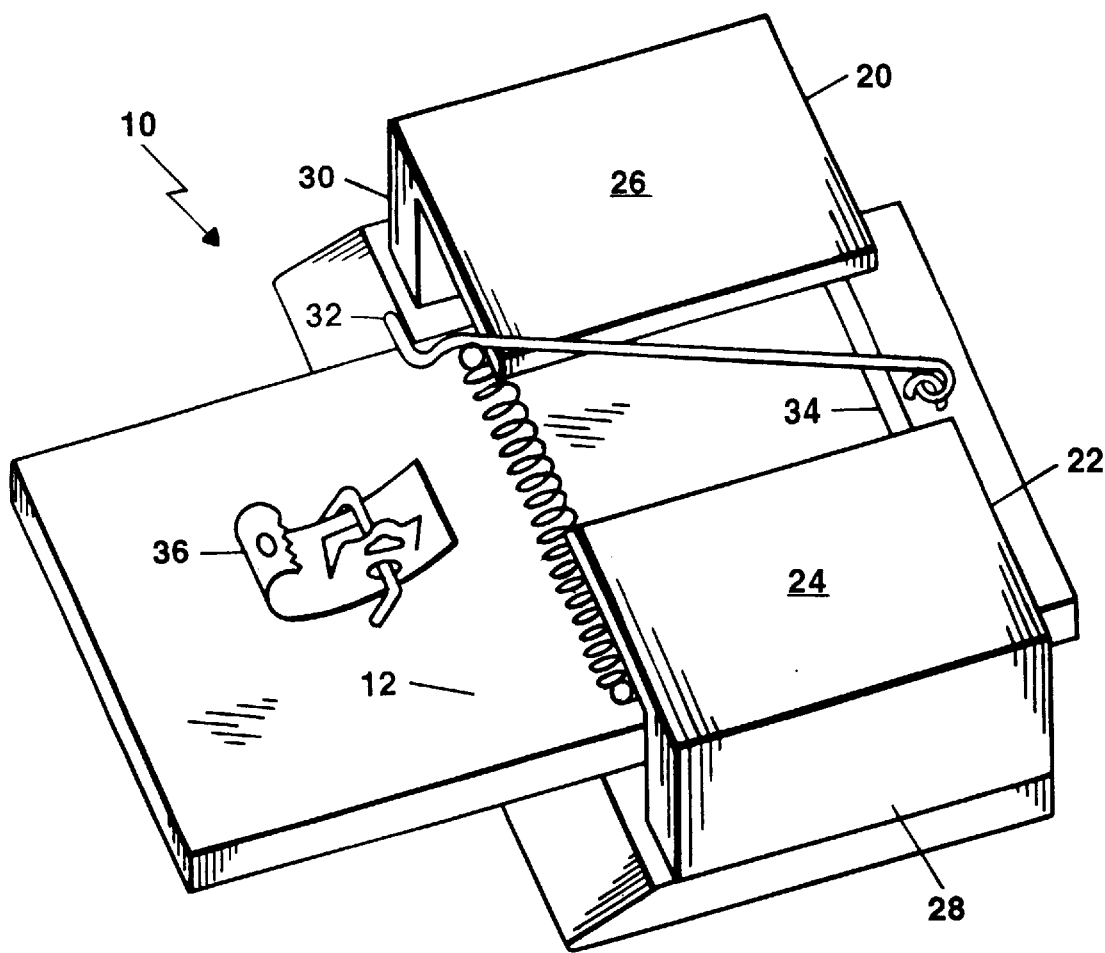
FIG. 6 pictorially illustrates a further embodiment of the safety trap setting device of this invention with a snap-type trap in place therein.

There is also incorporated into the device 10 a means for determining the position in which the mouse trap sits with respect to the Trap Setter. For example, a back stop 16 can be used such that the mouse trap 12 is slid over the base 14 until it stops against the back stop 16. Other methods could be used to indicate positioning of the mouse trap with respect to the Trap Setter such as lines or arrows drawn on the base, or making the length of the base such the trap is placed with the end of the trap coinciding with the end of the Trap Setter base or by creating a base which is sculpted to fit the base of the trap. The back stop 16 has the advantage of making the Trap Setter easy to use—not requiring significant thought as to how far to push the trap into the Trap Setter—and easy to manufacture. Position is important for the spring stopping mechanism 18 to function properly as well as to allow easy removal of the trap from the Trap Setter once it is set (the trap extends approximately ¼ of an inch beyond the base of the Trap Setter so that it is easily accessible by hand). It would also be possible to make the backstop 16 adjustable with respect to base 14 to accommodate traps of different sizes. In the case where a larger snap trap (rat trap) is utilized, or even with some smaller traps, as shown in FIG. 6 of the drawings, the backstop 16 may be omitted, the base shortened and terminating in a ramp or incline in order to permit the snap trap to be slid out of the back end of the safety trap setting device for removal therefrom.

The Trap Setter 10 also includes a physical characteristic which prevents a mouse trap from fully deploying while in position therein. This is accomplished, for example, by the spring stopping mechanism 18 which, preferably, includes two spaced apart inverted L-shaped structures 20 and 22, made of members 24 and 26, respectively, attached to the base 14 by supporting columns 28 and 30, (which also help to laterally position the mouse trap in the Trap Setter). A space S between the two structures 20 and 22 allows for the locking bar 32 on the mouse trap 12 as shown in FIG. 5 to be placed into its set position while the mouse trap 10 sits in the Trap Setter.

The same result can be achieved in different ways such as including only one structure instead of two or by a structure attached to the front end F of the Trap Setter 10. The advantage of the methods used in the example shown is that the columns 28 and 30 provide lateral positioning guidance, the use of two structures provide greater stopping power and stability, the positioning of the structures allow for deviations in the manufacture of the mouse trap such that the structure will still stop the bow 34 from fully deploying even if it is manufactured in a slightly different position and this configuration allows for the mouse trap to be slid into the Trap Setter from the front which allows removal by touching only the safe portion of the trap. The two structures 20 and 22 are positioned in such a way as to allow tension to be placed on the bow 34 when engaging the locking bar 32. This allows the mouse trap to be set, allows additional clearance for differences in the manufacture of the mouse trap and allows a small movement of the bow for testing the sensitivity of the mouse trap.

An additional, optional element not shown in the drawings is a catch mechanism which would stop the mouse trap from being thrown out of the Trap Setter in the event the mouse trap were to deploy while it was being removed from the Trap Setter 10. This catch would be made of pins or other objects attached to the stopping mechanism 18 on which the bow 34 would catch, when deploying as being removed.

The size of the safety trap setting device 10 may vary, with typical dimensions based upon the size of the snap trap used therewith being, for example, 2" or more in length, 3"–5" in width and 1"–2" in height. The members 24 and 26 may be sized accordingly. The dimensions provided are merely exemplary and would differ depending on the size and type of the mouse/rat snap trap and the material out of which the Trap Setter is constructed.

Trap Setter 10 can be constructed of various types of wood connected to each other with nails and/or glue. The Trap Setter 10 could also be constructed out of many other types of materials such as plastic or aluminum and could constitute a single object rather than several attached objects. For example, if the Trap Setter were made out of plastic, the size of the trap could be reduced in size such that it is only slightly larger than the mouse trap itself. The columns 28 and 30 supporting the two structures 24 and 26, respectively, would not need to be as wide and the base 14, back stop 16 and structures 24 and 26 could all be thinner. The idea of making the Trap Setter only slightly bigger than the mouse trap itself is commercially appealing because it would allow packaging of the Trap Setter together with the mouse traps since one trap could be placed inside of the Trap Setter as part of the packaging. Therefore, instead of packaging four mousetraps, as is commonly done today, three mousetraps could be packaged together with the Trap Setter with one mouse trap sitting inside of the Trap Setter. In addition, the simple design and ease with which the device 10 of this invention could be manufactured, out of plastic, wood or aluminum, reduce the cost of manufacture.

Mode of Operation

With reference to FIG. 5 of the drawings, the Trap Setter 10 of this invention would be used as follows. The user would select a Trap Setter appropriate for the size and style mouse trap they wished to set or test. The bow 34 on the mouse trap 12 would be pulled back and held firm at the safe end of the trap. The trap 12 would then be slid into the Trap Setter 10. After the insertion of the trap 12 into the Trap Setter 10 until the trap strikes the back stop 16 (if used), the stopping mechanism 18 prevents the bow from deploying and the hold can be released. The locking bar 32 of the trap 12 is placed over the bow 34 to the bait pedal 36 between the stopping structures 20 and 22 and engaged.

The mouse trap 12 can then be tested by touching the bait pedal 36 and adjustments to the trap's sensitivity can be made either by adjusting how the locking bar connects with the bait petal or by bending the bait petal or locking bar in a way that make the trap more sensitive. The bait pedal 36 can be baited either before the trap is inserted into the Trap Setter or while in the Trap Setter. When the trap is ready to be placed in position, this can be done by removing the trap from the Trap Setter using your fingers on the portion of the trap extending beyond the Trap Setter on the safe end of the trap, or by sliding the trap out of the Trap Setter by tilting it and allowing gravity to pull the trap out, or in the case of a safety trap setting device (see FIG. 6) having a shortened base and no back stop merely sliding the snap trap out the back of the safety trap setting device. After the trap is placed, the Trap Setter can be re-used indefinitely.

Although the invention has been described with respect to various embodiments, it should be realized this invention is also capable of a wide variety of further and other embodiments within the spirit and scope of the appended claims.

What is claimed is:

1. A safety trap setting device for use in conjunction with a swinging striker trap having a selectively activated member and a retaining member capable of holding the selectively activated member in a deactivated, retracted position, said safety trap setting device comprising:

a structure configured to accept at least a portion of the trap, said structure including a mechanism for preventing the selectively activated member from completely snapping from the retracted position when not engaged by the retaining member;

said structure having, a front a base which includes a substantially flat top portion of a preselected width, said substantially flat top portion being free from encumbrances adjacent said front, a bottom portion having no protrusions thereon, a front and a back, said bottom portion capable of being rested on a surface and said top portion capable of receiving from said front the trap in a sliding relationship thereto;

said mechanism for preventing the selectively activated member from completely snapping from the retracted position comprises a pair of substantially identical inverted L-shaped components having a space situated therebetween for receiving the trap and capable of permitting the retaining member to freely move therein to engage the selectively activated member, and said back of said base being configured to permit movement of the retaining member;

each of said substantially identical inverted L-shaped components having an upstanding member affixed at one end thereof to said top portion of said base and having a horizontal member affixed to another end of said upstanding member, each said horizontal member being completely flat from end to end and lying along a plane parallel to said flat top portion of said base, and each said horizontal member having a width extending along said preselected width and being at least one quarter of said preselected width of said top portion, each said upstanding member being spaced apart one from another a preselected distance, said pre-selected distance being slightly larger than a width of the swinging striker trap; and each said horizontal member capable of engaging the selectively activated member of the trap to prevent full movement of said selectively activated member from the retracted position when the selectively activated member is released from the retracted position;

whereby the safety trap setting device is capable of effectively preventing the selectively activated member from completely snapping from the retracted position while being at least partially within the safety trap setting device.

2. The safety trap setting device as defined in claim 1 further comprising a stop member adjacent said back of said base for engaging the swinging striker trap as it is placed within said structure.

3. The safety trap setting device as defined in claim 1 wherein said base being inclined at said front of said base.

4. The safety trap setting device as defined in claim 3 further comprising a stop member adjacent said back of said base for engaging the swinging striker trap as it is placed within said structure.

5. The combination of a safety trap setting device and a swinging striker trap, comprising:

a swinging striker trap, said swinging striker trap having a selectively activated member and a retaining member capable of holding said selectively activated member in a deactivated, retracted position; and a safety trap setting device, said safety trap setting device comprising:

a structure configured to accept at least a portion of said trap, said structure including a mechanism for preventing said selectively activated member from completely snapping from the retracted position when not engaged by the retaining member;

said structure having a base which includes a top portion, a bottom portion having no protrusions thereon, a front and a back, said bottom portion capable of being rested on a surface and said top portion capable of receiving said trap in a sliding relationship thereto;

said mechanism for preventing the selectively activated member from completely snapping from the retracted position comprises a pair of inverted L-shaped components having a space situated therebetween for receiving said trap and capable of permitting the retaining member to freely move therein to engage said selectively activated member, and said back of said base being configured to permit movement of said retaining member;

each of said inverted L-shaped components having an upstanding member affixed at one end thereof to said top portion of said base and having a horizontal member affixed to another end of said upstanding member, said upstanding members being spaced apart one from another a preselected distance, said preselected distance being slightly larger than a width of said swinging striker trap; and each said horizontal member being substantially parallel to said top portion of said base and capable of engaging said selectively activated member of the trap to prevent full movement of said selectively activated member from said retracted position when said selectively activated member is released from the retracted position;

whereby said safety trap setting device is capable of effectively preventing said selectively activated member from completely snapping from said retracted position while being at least partially within said safety trap setting device.

6. The combination as defined in claim 5 further comprising a stop member adjacent said back of said base for engaging said swinging striker trap as it is placed within said structure.

7. The safety trap setting device as defined in claim 5 wherein said base being inclined at said front of said base.

8. The safety trap setting device as defined in claim 7 further comprising a stop member adjacent said back of said base for engaging said swinging striker trap as it is placed within said structure.

* * * * *